(12) United States Patent
Hammerschmidt et al.

(10) Patent No.: US 9,994,179 B2
(45) Date of Patent: Jun. 12, 2018

(54) CIRCUIT ARRANGEMENTS AND A METHOD FOR RECEIVING INFORMATION

(75) Inventors: Dirk Hammerschmidt, Villach (AT); Timo Dittfeld, Munich (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 1379 days.

(21) Appl. No.: 13/557,366

(22) Filed: Jul. 25, 2012

(65) Prior Publication Data

US 2014/0028086 A1    Jan. 30, 2014

(51) Int. Cl.
  *B60R 21/017*    (2006.01)

(52) U.S. Cl.
  CPC ................................ *B60R 21/0173* (2013.01)

(58) Field of Classification Search
  CPC .................................................. B60R 21/0173
  See application file for complete search history.

(56) References Cited

U.S. PATENT DOCUMENTS

| | | | | |
|---|---|---|---|---|
| 3,641,539 A * | 2/1972 | Lesher | ................... | G08B 25/00 340/533 |
| 3,911,391 A * | 10/1975 | Held | ................... | B60R 21/0132 180/274 |
| 4,238,775 A * | 12/1980 | Vandling | ................ | H04N 1/327 358/439 |
| 4,311,986 A * | 1/1982 | Yee | .......................... | H04Q 9/14 340/10.31 |
| 5,394,438 A * | 2/1995 | Takai | ..................... | H04L 25/49 341/63 |
| 6,563,252 B2 * | 5/2003 | Schrod | .................. | H02N 2/067 310/316.03 |
| 7,719,291 B2 * | 5/2010 | Gundlach | ................ | G01D 5/24 324/658 |
| 7,944,216 B2 * | 5/2011 | Brasseur | ............. | G01D 5/2405 324/679 |
| 8,570,053 B1 * | 10/2013 | Ryshtun | ............... | H03K 17/962 324/678 |
| 8,660,489 B2 * | 2/2014 | Barrenscheen | ...... | H04B 5/0031 375/258 |
| 8,849,520 B2 * | 9/2014 | Hammerschmidt | ...................... | B60W 50/0205 701/29.8 |

(Continued)

FOREIGN PATENT DOCUMENTS

CN    101458291 A    6/2009
CN    102597790 A    7/2012

(Continued)

OTHER PUBLICATIONS

Fetterman, "Ultrafast pulse shaping: amplification and characterization," Nov. 9, 1998, Optics express, vol. 3, No. 10, pp. 366-375.*

(Continued)

*Primary Examiner* — Thienvu Tran
*Assistant Examiner* — Pinping Sun
(74) *Attorney, Agent, or Firm* — Slater Matsil, LLP

(57) ABSTRACT

A circuit arrangement is provided, the circuit arrangement including a receiver configured to receive signal information from a sensor circuit; a discharge circuit configured to discharge a capacitance by providing a discharge pulse; and a modulation circuit configured to modulate a bit pattern onto the discharge pulse.

28 Claims, 7 Drawing Sheets

(56) References Cited

U.S. PATENT DOCUMENTS

| | | | |
|---|---|---|---|
| 2002/0035382 A1* | 3/2002 | Rubin | A61N 1/3906 607/5 |
| 2007/0068511 A1* | 3/2007 | Bachinsky | F24C 3/122 126/503 |
| 2008/0013466 A1* | 1/2008 | Kowalewski | H04L 12/1822 370/261 |
| 2008/0080624 A1* | 4/2008 | Feldtkeller | H04L 25/0268 375/244 |
| 2008/0100378 A1* | 5/2008 | Bernacchia | H02M 7/5388 327/589 |
| 2009/0078587 A1* | 3/2009 | Farber | G01N 27/4065 205/781 |
| 2009/0243633 A1* | 10/2009 | Brasseur | G01D 5/2405 324/681 |
| 2010/0091525 A1* | 4/2010 | Lalithambika | H02M 1/08 363/21.02 |
| 2011/0110011 A1* | 5/2011 | Dittfeld | B60R 21/017 361/248 |
| 2012/0226965 A1* | 9/2012 | Hammerschmidt | H03M 13/093 714/807 |
| 2012/0235800 A1* | 9/2012 | Hammerschmidt | H04B 3/546 340/12.22 |
| 2013/0043908 A1* | 2/2013 | Hammerschmidt | H03K 5/22 327/87 |
| 2013/0253774 A1* | 9/2013 | Hammerschmidt | B60W 50/0205 701/45 |
| 2013/0271422 A1* | 10/2013 | Hotelling | G06F 3/044 345/174 |
| 2015/0078498 A1 | 3/2015 | Hamperl | |

FOREIGN PATENT DOCUMENTS

| | | |
|---|---|---|
| DE | 102012103868 A1 | 11/2013 |
| GB | 1339746 A | 12/1973 |
| WO | 2011051910 A1 | 5/2011 |
| WO | WO 2011152628 A2 * | 12/2011 ........... A61B 18/203 |

OTHER PUBLICATIONS

Infineon, TLE 7729, Airbag Satellite Receiver IC SATRIC, Automotive Power, Data Sheet, Rev. 4.0, Sep. 2008.

Peripheral Sensor Interface for Automotive Applications, Base Specification, V2.0, Jun. 1, 2011; pp. 1-59.

Peripheral Sensor Interface for Automotive Applications, Substandard Airbag, V2.0, Jun. 1, 2011; pp. 1-9.

Peripheral Sensor Interface for Automotive Applications, Substandard Vehicle Dynamics Control, V2.0, Jun. 1, 2011; pp. 1-10.

Peripheral Sensor Interface for Automotive Applications, Substandard Powertrain, V2.0, Jun. 1, 2011; pp. 1-5.

* cited by examiner

CIRCUIT ARRANGEMENTS AND A METHOD FOR RECEIVING INFORMATION

TECHNICAL FIELD

Various embodiments relate generally to circuit arrangements and a method for receiving information.

BACKGROUND

In many electronic systems, e.g. in automobile systems, a safety transmission of sensor data should be guaranteed. High requirements may be imposed on the functional safety of sensor data, usually through safety standards, e.g. ISO26262. For example sensor interfaces based on the PSI5 standard are used in airbag systems today. At start-up, fixed pre-determined sequences may be sent from a sensor to a receiver circuit. In today's systems, the diagnostics of the signal chain may be carried out only once during the turn on phase of the system. After start-up, data such as sensor or status information may be sent to the receiver circuit. Even if diagnostics were to be carried out, e.g. continuously during operation, the diagnostic intervals are usually so large that, in cases of failure, it may not be possible to diagnose a signal chain in a time interval small enough to react in sufficient time. Mistakes which occur during the operation time may be dealt with inadequately; therefore mistakes may only be partially diagnosed or be missed completely.

SUMMARY

Various embodiments provide a circuit arrangement, including a receiver configured to receive signal information from a sensor circuit; a discharge circuit configured to discharge a capacitance by providing a discharge pulse; and a modulation circuit configured to modulate a bit pattern onto the discharge pulse.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
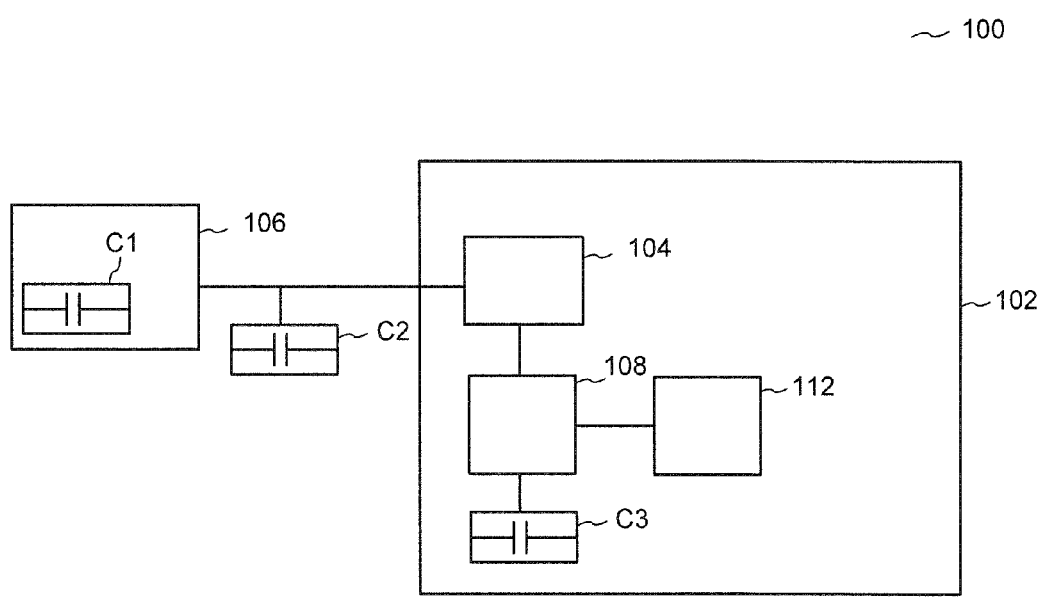
FIG. 1 shows a circuit arrangement according to an embodiment.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Many sensor systems rely on safety checks, e.g. via diagnostic features, which may only take place at a pre-defined designated time, for example during the startup of the system or during predefined diagnostic intervals. For example, in many airbag systems, the signal chain must fulfill a high safety level given by today's standards. Sporadically, mistakes may only be diagnosed during start-up or diagnostic intervals which are not fast, e.g. frequent, enough. Higher safety levels may allow elements of the signal chain to be continually diagnosed sufficiently fast, e.g. frequently, even during the operation of the signal chain.

Various embodiments may apply to electronic systems whose components require testing to ensure that they are not faulty. Various embodiments may be applied to a sensor-receiver system, wherein signal information from a sensor may be processed by one or more processing circuits in the receiver, and wherein testing may be required to ensure that the one or more processing circuits are functioning correctly.

Various embodiments may apply to sensor systems used in manufacturing systems and/or automotive systems, wherein such systems may rely on the reliable functioning of processing circuits to process signal information.

Various embodiments may apply to sensor receiver systems configured to process signal information, such as temperature sensor information, speed sensor information, moisture sensor information, humidity sensor information, flow sensor information, gas sensor information, radiation sensor information, chemical sensor information, biological sensor information, acceleration sensor information, pressure sensor information.

Various embodiments provide a system wherein continual testing, e.g. real time testing, of a signal chain in a receiver during operations times may be easily implemented.

Various embodiments provide a system with a much smaller diagnostic interval and which reacts in a smaller reaction time, for example, by diagnosing a signal chain after and/or before receipt of every signal.

Various embodiments provide a system wherein different requirements on the functional safety may be implemented through uncomplicated means in a receiver circuit.

Various embodiments provide a system wherein test signals which may help to diagnose the signal chain may be generated in intervals, e.g. time intervals, wherein no sensor data is transmitted.

Various embodiments provide a system wherein continual testing, e.g. real time testing, of a signal chain in a receiver during operations times may be easily implemented.

FIG. 1 shows circuit arrangement 102 according to an embodiment. Circuit arrangement 102 may include receiver circuit 104 configured to receive signal information from sensor circuit 106; discharge circuit 108 configured to discharge a capacitance Cp by providing a discharge pulse; and modulation circuit 112 configured to modulate a bit pattern onto the discharge pulse. In various embodiments, receiver circuit 104, discharge circuit 108, and modulation circuit 112 may be coupled with each other via one or more electrically conductive lines, such as e.g. a plurality of bus lines. Parasitic capacitance Cp may include capacitances in at least one of sensor circuit 102 ($C_1$), wiring network 114 ($C_2$), and receiver circuit 104 ($C_3$).

Figure 2:
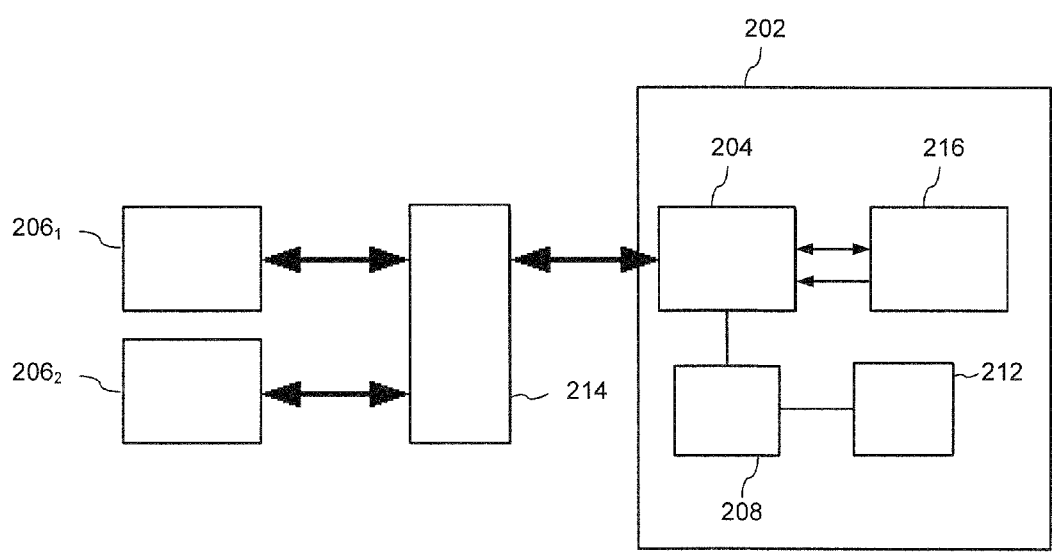
FIG. 2 shows a circuit arrangement according to an embodiment.

FIG. 2 shows circuit arrangement 202 according to an embodiment.

Circuit arrangement 202 may include the basic functionalities of one or more or all the features described with respect to circuit arrangement 102.

Circuit arrangement 202 may include receiver circuit 204 configured to receive signal information from sensor circuit 206; discharge circuit 208 configured to discharge a capacitance Cp by providing a discharge pulse; and modulation circuit 212 configured to modulate a bit pattern onto the discharge pulse. Circuit arrangement 202 may include modulation circuit 212 connected to discharge circuit 208, wherein modulation circuit 212 may be configured to modulate a bit pattern onto at least a portion of the discharging current pulse.

Receiver circuit 204 may include the basic functionalities of one or more or all the features described with respect to receiver circuit 104. Discharge circuit 208 may include the basic functionalities of one or more or all the features described with respect to discharge circuit 108. Sensor circuit 206 may include the basic functionalities of one or more or all the features described with respect to sensor circuit 106. Sensor circuit 206 may include at least one sensor from the following group of sensors, the group of sensors consisting of: temperature sensors, speed sensors, moisture sensors, humidity sensors, flow sensors, gas sensors, radiation sensors, chemical sensors, biological sensors, acceleration sensors, pressure sensors. Modulation circuit 212 may include the basic functionalities of one or more or all the features described with respect to modulation circuit 112.

Circuit arrangement 202 may be connected to sensor circuit 206 via wiring network 214. Circuit arrangement 202 may be connected to one or more sensor circuits $206_1$, $206_2$ via wiring network 214. One or more sensor circuits $206_1$, $206_2$, may include a satellite sensor actuator circuit. Circuit arrangement 202 may be connected to controller circuit 216.

Discharge circuit 208 may include the basic functionalities of one or more or all the features described with respect to discharge circuit 508 described hereinafter. Sensor circuit 206 may include the basic functionalities of one or more or all the features described with respect to sensor circuit 506 described hereinafter. Modulation circuit 212 may include the basic functionalities of one or more or all the features described with respect to modulation circuit 512 described hereinafter.

FIG. 2 shows a typical bus topology, which may be used in an airbag system. The sensor interface may have a high safety level, e.g. ASIL B level, which in turn may place special requirements on the individual components of the signal chain, wherein the main components of a signal chain are the sensor unit, network and receiver unit. However, it is to be noted that various embodiments are not limited to this application but may be used in any other suitable application.

Figure 3A:
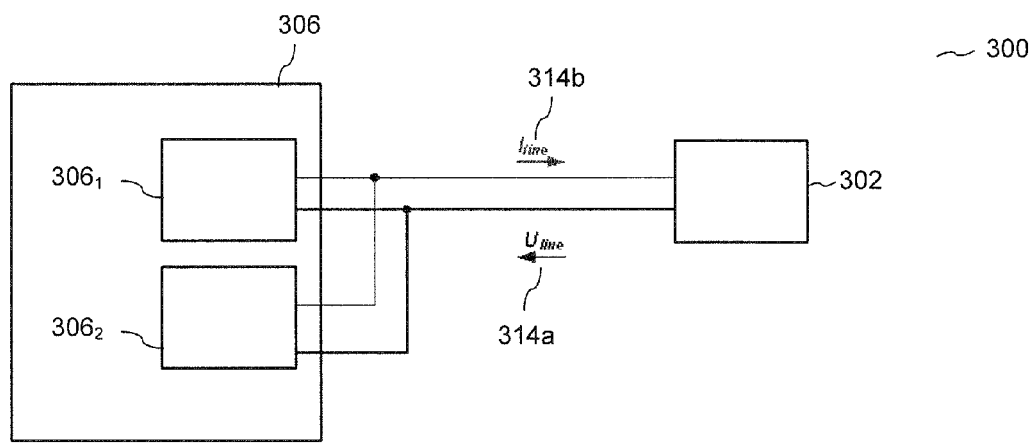
FIG. 3A shows a circuit arrangement according to an embodiment.

FIG. 3A shows circuit arrangement 302 according to an embodiment. The basic functionalities of one or more or all the features described with respect to at least one of circuit arrangement 102 and circuit arrangement 202 may be applicable to receiver circuit 302.

Circuit arrangement 302 may be connected to sensor circuit 306 via wiring network 314. Circuit arrangement 302 may be connected to one or more sensor circuits $306_1$, $306_2$ via wiring network 314. One or more sensor circuits $306_1$, $306_2$, may include a satellite sensor actuator circuit. Circuit arrangement 302 may be connected to a controller circuit. It may be understood that circuit arrangement 302 and the controller circuit may be embedded in a single piece silicon; for example, in a system on chip (SOC), or in one package; for example, in a system in package (SOP).

Circuit arrangement 302 may include the basic functionalities of one or more or all the features described with respect to circuit arrangement 202. Sensor circuit 306 may include the basic functionalities of one or more or all the features described with respect to sensor circuit 206. Sensor circuit 306 may include a sensor actuator circuit. Each sensor actuator circuit, e.g. sensor actuator circuit $306_1$, e.g. sensor actuator circuit $306_2$ may include the basic functionalities of one or more or all the features described with respect to the sensor actuator circuits described with respect to FIG. 2, e.g. sensor actuator circuit $206_1$, e.g. sensor actuator circuit $206_2$.

Discharge circuit 308 (not shown) may include the basic functionalities of one or more or all the features described with respect to discharge circuit 508 described hereinafter. Sensor circuit 306 may include the basic functionalities of one or more or all the features described with respect to sensor circuit 506 described hereinafter. Modulation circuit 312 may include the basic functionalities of one or more or all the features described with respect to modulation circuit 512 described hereinafter.

Wiring network 314 may include a channel which may include connecting line 314a and connecting line 314b. Connecting lines 314a and connecting lines 314b may include a twisted pair of wires, e.g. a pair of electrically conductive wires. A pair of connecting lines, i.e. connecting line 314a and connecting line 314b may form a channel, e.g. a transmission channel Wiring network 314 may include a plurality of channels, e.g. two, three, four or more transmission channels, each channel including a pair of connecting lines 314a, 314b. Each channel may support the transmission from one or more sensor actuator circuits. For example, a channel including connecting line 314a and connecting line 314b may support one or more satellites. For example, a channel including connecting line 314a and connecting line 314b may support transmission signal information between two satellite sensor actuator circuits $306_1$, $306_2$, and circuit arrangement 302. Each satellite sensor actuator circuit, e.g. each of sensor actuator circuit $306_1$ and sensor actuator circuit $306_2$ may include a one or more individual sensor circuits. Each satellite sensor actuator circuit 306 may include one or more sensors. For example, each satellite sensor actuator circuit may include up to, but is not limited to, eight sensors. Sensor circuit 306 may be connected to circuit arrangement 302 via at least one channel, e.g. a channel including connecting lines 314a and 314b.

For example, connecting line 314a may be configured to supply sensor circuit 306 with a voltage, e.g. a constant voltage and to transport current modulated data from sensor circuit 306 to circuit arrangement 302. Connecting line 314b may be a ground connection.

Figure 3B:
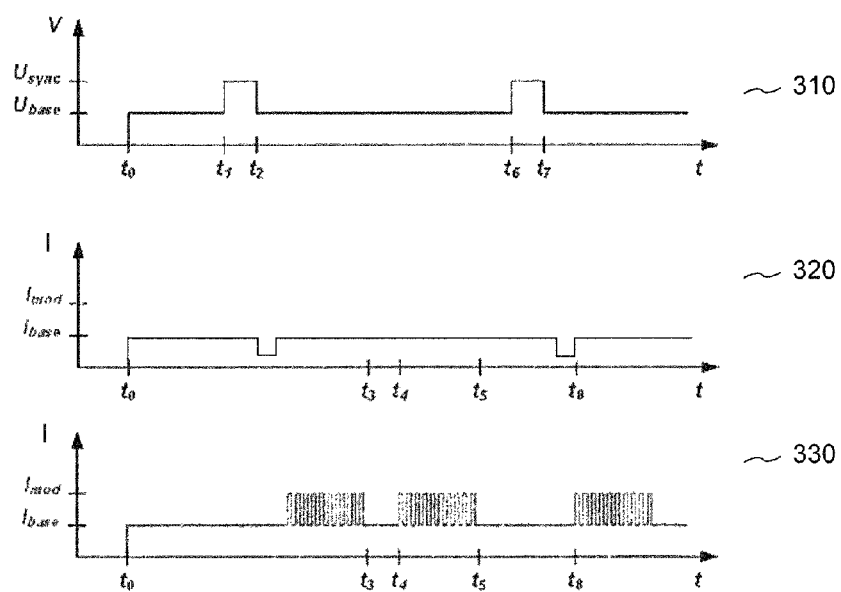
FIG. 3B shows a timing diagram of a circuit arrangement according to an embodiment.

FIG. 3B shows a timing circuit of a circuit arrangement in synchronous mode according to an embodiment.

At startup $t_0$, a voltage regulator in circuit arrangement 302 may be started up, and a voltage, e.g. an interface DC voltage, may be increased to $U_{base}$. For example, a regulated interface DC voltage may be increased from 0V to $U_{base}$, wherein $U_{base}$ is a pre-programmed value. According to an embodiment, $U_{base}$ may be approximately 6V. $U_{base}$ may range from about 5 V to about 8 V, e.g. about 5.5 V to about 7 V, e.g. about 6 V to about 6.5V. The transmission of the regulated interface DC voltage thereby draws a current from sensor circuit 306. The quiescent current drawn by sensor circuit 306 may have a current level $I_{base}$ as shown in FIG. 3B. $I_{base}$ may be approximately 4 mA. $I_{base}$ may range from about 3 mA to about 10 mA, e.g. about 4 mA to about 9 mA, e.g. about 5 mA to about 8 mA. The voltage may range from about 4.5 V to about 8V, e.g. about 5 V to about 7 V, e.g. about 5 V to about 6 V.

Circuit arrangement 302 may be configured to operate in synchronous or asynchronous mode.

In synchronous mode, the regulated output voltage may be switched between a synchronization pulse voltage $U_{sync}$ and interface DC voltage $U_{base}$, for example, in the form of a voltage pulse. $U_{sync}$ may be approximately 11 V. $U_{sync}$ may range from about 9 V to about 12 V, e.g. from about 9.5 V to about 11.5 V, e.g. about 10 V to about 11 V. The pulse width of the synchronization pulse may be represented in FIG. 3B. The pulse width as shown in 310, may be a pulse between time $t_1$ to $t_2$, and between $t_6$ to $t_7$. The synchronization pulse may serve as an indication signal, which may be generated in the receiver, and sent to sensor circuit 306. The indication signal may be sent from circuit arrangement 302 to sensor circuit 306, e.g. sensor actuator circuit $306_1$, via connecting line 314a. After sensor circuit 306 receives the indication signal, sensor circuit 306 may subsequently send its sensor data information to receiver circuit 304 of circuit arrangement 302, as shown in 330. Sensor circuit 306 may send its sensor data information to receiver circuit 302 via connecting line 314b.

The sensor data information may include encoded sensor data information, which may be represented by data pulses ranging from $I_{base}$ to $I_{mod}$. $I_{mod}$ may range from about 11 mA to about 15 mA, e.g. about 12 mA to about 15 mA, e.g. about 13 mA to about 14 mA; for example, sum of $I_{base}$ and $I_{mod}$ could equals sum of 4 mA and 11 mA. Time frame $t_3$ to $t_4$ may represent the interframe time $t_{IF}$ between encoded sensor data transmissions. The satellite synchronisation period $t_{SP}$ may be represented by time frame $t_1$ to $t_6$, wherein $t_6-t_1$ is the time period between a first indication signal and a second indication signal, i.e. between consecutive synchronization pulses.

Synchronisation time interval $t_S$ may represent the time frame $t_5$ to $t_8$, which may include a time period between the end of a final data frame of encoded sensor data information sent by sensor 306 to receiver circuit 304 in response to a first indication signal sent by circuit arrangement 302 to sensor 306, e.g. between $t_1$ and $t_2$, and the start of a first data frame of encoded sensor data information sent by sensor 306 to receiver circuit 304 in response to a second indication signal sent by circuit arrangement 302 to sensor circuit 306, e.g. between $t_6$ and $t_7$. Synchronization time interval $t_S$ may include the latency time between the end of the receipt of encoded sensor data information in response to a previous synchronization signal and the start of a subsequent synchronization signal, e.g. time period $t_5$ to $t_6$; the time period of the pulse width of the subsequent synchronization signal, e.g. time $t_6$ to $t_7$; and the latency time between the end of the subsequent synchronization signal and the start of receipt of encoded sensor data information, e.g. time period $t_7$ to $t_8$.

Circuit arrangement 302 may include one or more or all of the basic features and functionalities of PSI5 receiver architecture, which may be provided over a discharge unit, e.g. discharge circuit 308, to discharge parasitic capacitance. The discharge of parasitic capacitance may be carried before sensor circuit 306 begins with the transmission of data, as shown in 320. In a simplest case, a current sink CSR may be provided at the signal line. Parasitic capacitance $C_P$ may include parasitic capacitances in sensor circuit 306 ($C_1$), in wiring network 314 ($C_2$), and in receiver circuit 304 ($C_3$).

Figure 4:
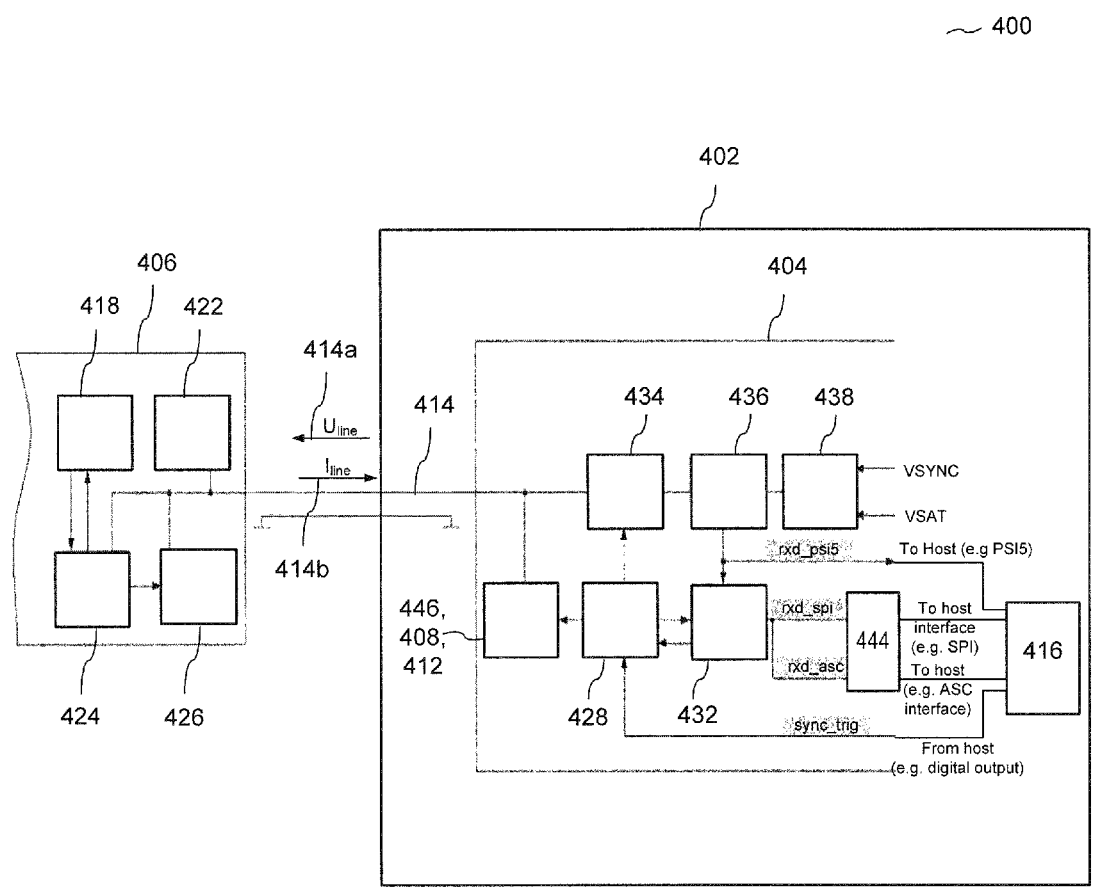
FIG. 4 shows a circuit arrangement according to an embodiment.

FIG. 4 shows a circuit arrangement according to an embodiment.

Circuit arrangement 402 may include the basic functionalities of one or more or all the features described with respect to circuit arrangement 302. Sensor circuit 406 may include the basic functionalities of one or more or all the features described with respect to sensor circuit 306.

Sensor circuit 406 may include a sensor actuator circuit, e.g. sensor actuator circuit $406_1$, e.g. sensor actuator circuit $406_2$, (not shown) which may include the basic functionalities of one or more of the features described with respect to the sensor actuator circuit, e.g. sensor actuator circuit $306_1$, e.g. sensor actuator circuit $306_2$, already described with respect to FIGS. 3A and 3B. Wiring network 414 may include connecting line 414a and connecting line 414b, which may include the basic functionalities of one or more or all the features described with respect to wiring network 314 including connecting line 314a and connecting line 314b. Connecting line 414a may be configured to supply sensor circuit 406 with a voltage, e.g. a constant voltage.

Sensor circuit 406 may include sensor cell 418, sensor control circuit 424, sensor power supply 422 and sensor modulation circuit 426.

Sensor cell 418 may include one or more sensors, e.g. inertia sensors, pressure sensors, temperature sensors, speed sensors, moisture sensors, humidity sensors, flow sensors, gas sensors radiation sensors, chemical sensors, biological sensors, or any other type of sensor as desired or required in the respective application. According to various embodiments, sensor cell 418 may include a sensor for automotive crash applications. Sensor cell 418 may be connected to sensor control circuit 424, and sensor data may be sent to from sensor cell 418 to sensor control circuit 424 via one or more electrical connections. Sensor power supply 422 and sensor modulation circuit 426 may be configured to provide encoded sensor data information from sensor control circuit 424 to circuit arrangement 402. Sensor modulation circuit 426 may be configured to encode the sensor data information received from sensor control circuit 424 and sensor cell 418. Sensor modulation circuit 426 may be configured to encode the sensor data information according to encoding algorithms, which may include Manchester encoding, e.g. Manchester-1 coding, e.g Manchester-2 coding. Sensor data information may include temperature sensor information, speed sensor information, moisture sensor information, humidity sensor information, flow sensor information, gas sensor information, radiation sensor information, chemical sensor information, biological sensor information, acceleration sensor information, pressure sensor information.

The sensor data may be carried from sensor circuit 406, through an encoded current modulated signal, e.g. a Manchester encoded current modulated signal. The encoded current modulated signal may be decoded, e.g. Manchester decoder, in the receiver unit 402, and provided to a host controller 416. The interfaces to the Host may be differently executed, e.g. SPI or asynchronous interfaces (UART) or voltage modulated Manchester-encoded signal with logic level.

Circuit arrangement 402 may include receiver circuit 404 configured to receive signal information from sensor circuit 406; discharge circuit 408 configured to discharge a capacitance Cp by providing a discharge pulse; and modulation circuit 412 configured to modulate a bit pattern onto the discharge pulse. Circuit arrangement 402 may include modulation circuit 412 connected to discharge circuit 408, wherein modulation circuit 412 may be configured to modulate a bit pattern onto at least a portion of the discharging current pulse. The basic functionalities of one or more or all the features described with respect to at least one of circuit arrangement 102, receiver circuit 202 and receiver circuit 303 may be applicable to receiver circuit 402.

Connecting line 414a may be configured to transport current modulated data from sensor circuit 406 to circuit arrangement 402. Wiring network 414 may form part of a satellite interface, wherein the main function of the satellite interface may be to supply the external connected satellites, e.g. one or more sensor actuator circuit $406_{1, 2 \ldots n}$, with a constant voltage and to receive the current modulated data. The external connected satellites $406_{1, 2 \ldots n}$(only $406_1$ shown)may each be connected to circuit arrangement 402 via a designated wiring network 414, or channel.

Circuit arrangement 402 may further include synchronization control circuit 428, decoder circuit 432, voltage regulator circuit 434, one or more current sense circuits 436, and receiver power supply 438.

The external connected satellites, i.e. one or more sensor actuator circuit $406_{1,2 \ldots n}$ of sensor circuit 406, may each be connected to voltage regulator circuit 434 via a satellite interface, which may include designated wiring network 414.

Receiver power supply 438 may be connected to one or more pins, e.g. one or more VSYNC pins, which may be configured to provide a power input, e.g. a DC power input, for generating the synchronization pulse, e.g. a high voltage supply. Receiver power supply 438 may be connected to one or more pins, e.g. one or more VSAT pins, which may be configured to supply an input to provide the satellite supply voltage via voltage regulator circuit 434. The current detection threshold may be programmed e.g. via SPI or set externally via a resistor. Receiver power supply 438 may be connected to one or more pins which may be configured to provide analog power e.g. a main DC power input, to receiver power supply 438. Receiver power supply 438 may be configured to provide a main DC power input over a channel, e.g. connecting line 414a, to sensor circuit 406. For example, receiver power supply 438 may be configured to provide a main DC power input over a channel, e.g. connecting line 414a, to a sensor actuator circuit $406_1$ of sensor circuit 406. Receiver power supply 438 may be configured to provide a main DC power input for generating the synchronization pulse over a channel, e.g. connecting line 414a, to sensor circuit 406.

The satellite interface can be configured individually to at least two operation modes, e.g. synchronous mode or asynchronous mode, wherein the operation modes may be controlled by host controller 416 over one or more interfaces, e.g. an input/out interface, e.g. a serial peripheral interface SPI.

In asynchronous mode, one satellite, i.e. one sensor actuator circuit, per receiver channel may be connected, without sync pulse generation. Voltage regulator 434 may provide a constant interface DC output voltage to be supplied to sensor circuit 406. The satellite may send encoded sensor data information without a dedicated request from circuit arrangement.

In synchronous mode, one or more satellites may be connected to the receiver over a single receiver channel. Circuit arrangement 402 may increase the output voltage, as described with respect to FIGS. 3A and 3B, to request the encoded sensor data information from the satellites. The procedure may be initiated by host controller circuit 416 for example, by signal edges or commands or via serial interfaces such as SPI or by generating a rising edge synchronization pulse. Receiver circuit 404 may be configured to transfer synchronous input data current from the satellite into an internal voltage signal in response to the synchronization pulse generated by voltage regulator circuit 434.

Synchronization control circuit 428 may be connected to a host controller circuit, e.g. host controller circuit 416, which may be configured to provide a satellite synchronization pulse trigger, sync_trig, to synchronization control circuit 428 when the receiver is operating in synchronous mode. Synchronization pulse trigger sync_trig may be provided through the implementation of an internal pull-down resistor. Triggering may be possible via a physical trigger or via a host interface 444, e.g. a serial interface. Host interface 444 may include a bidirectional host interface, e.g. a serial parallel interface or e.g. an Asynchronous/Synchronous Serial Interface (ASC) interface. Communication between decoder circuit 432 and host interface 444 may be bi-directional.

Voltage regulator circuit 434 may be in electrical connection with receiver power supply 438. Voltage regulator circuit 434 may be in electrical connection with receiver power supply 438 via one or more current sense circuits 436. Voltage regulator circuit 434 may be in connection with synchronization control circuit 428 and receiver power supply 438, wherein voltage regulator circuit 434 may be configured to send a regulated constant voltage supply to sensor circuit 406. Voltage regulator circuit 434 may be configured to generate a regulated output voltage for supplying the satellites. Voltage regulator circuit 434 may be configured to provide different operating voltages with specified rising and falling times between them. For example, voltage regulator circuit 434 may be configured to not to provide a voltage at the disable state. Voltage regulator circuit 434 may be configured to provide a voltage, e.g. Ubase, to sensor circuit 406, in normal operating mode. Voltage regulator circuit 434 may be configured to provide a synchronization pulse voltage, e.g. $U_{sync}$, to sensor circuit 406. Voltage regulator circuit 434 may be configured to protect circuit arrangement 402 against failure conditions, e.g. over current conditions. At the end of the defined synchronization pulse width, voltage regulator circuit 434 may be configured to switch the output voltage to the interface DC output voltage, i.e. to normal operating mode, until the next rising edge of the syn_trig signal activates the sync pulse generation again. The fall time of the sync pulse may be controlled by voltage regulator circuit 434 similar to the rising edge.

The receiver interface, which may include current sense circuit 436, e.g. a resistor and a comparator, may be configured to convert the received current data from the satellite to an internal voltage. The internal voltage may also compatible to host I/O levels, so that the host can also read it, e.g. signal rxd_psi5. For example, current sense circuit 436 may be configured to convert the received current data from the satellite to an internal voltage proportional to the received current data. Therefore, current sense circuit 436 may also be configured to convert received current data, e.g. the signal data information, e.g. encoded sensor data information, from the sensor circuit, into an internal voltage. The converted voltage data may be supplied to decoder circuit 432 wherein it is decoded, and subsequently transmitted to controller circuit 416 via an interface, e.g. a serial peripheral interface SPI, e.g. an input/output interface. Current sense circuit 436 may include one or more amplifiers, e.g. differential amplifiers, e.g. operational amplifiers.

Figure 5A:
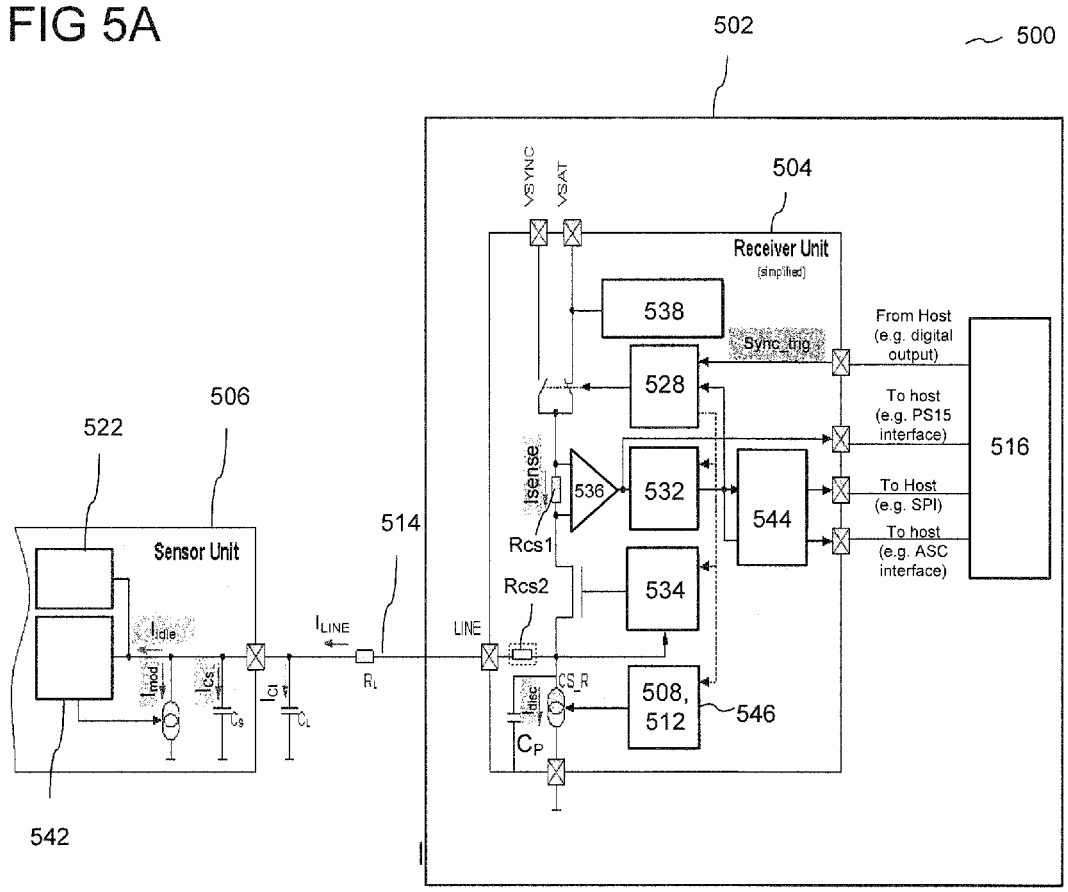
FIG. 5A shows a circuit arrangement according to an embodiment.

FIG. 5A shows circuit arrangement 502 according to an embodiment.

Circuit arrangement 502 may include the basic functionalities of one or more or all the features described with respect to circuit arrangement 402. Circuit arrangement 502 may be in connection with sensor circuit 506, wherein sensor circuit 506 may include the basic functionalities of one or more or all the features described with respect to sensor circuit 406.

Circuit arrangement 502 may include receiver circuit 504. Receiver circuit 504 may be configured to receive signal information including a current signal from sensor circuit 506.

Receiver circuit 504 may be configured to receive signal information including encoded sensor data information from sensor circuit 506. Receiver circuit 504 may be configured to generate the bit pattern such that it includes an encoded bit pattern.

Sensor circuit 506 may further include synchronization pulse detector circuit 542 which may be connected to sensor modulator circuit 426.

Circuit arrangement 502 may include discharge circuit 508 connected to receiver circuit 504, wherein discharge circuit 508 may be configured to discharge parasitic capacitances, e.g. capacitances in the signal chain 514, e.g. capacitances in receiver circuit 504, e.g. capacitances in sensor circuit 506. Discharge circuit 508 may be configured to discharge a capacitance from at least one of sensor circuit 506 and receiver circuit 504.

Circuit arrangement 502 may include modulation circuit 512 connected to discharge circuit 508, wherein modulation circuit 512 may be configured to modulate a bit pattern onto at least a portion of the discharging current pulse. Discharge circuit 508 may be located in receiver circuit 504. Discharge circuit 508 may be located in sensor circuit 506. Discharge circuit 508 may be configured to provide the discharge pulse for discharging the capacitance, depending on the timing of signal information received by receiver circuit 504. Discharge circuit 508 may be configured to provide the discharge pulse for discharging the capacitance after the receiver circuit 504 has sent the indication signal to sensor circuit 506. Sensor circuit 506 may be configured to send the signal information including encoded sensor data information to receiver circuit 504 after discharge circuit 508 has discharged the capacitance. Discharge circuit 508 may include a current-sink.

Circuit arrangement 502 may include one or more processing circuits wherein the one or more processing circuits may be configured to process the signal information received from sensor circuit 506. The one or more processing circuits may include synchronization control circuit 528, decoder circuit 532, voltage regulator circuit 534, one or more current sense circuits 536, and receiver power supply 538. Circuit arrangement 502 may further include one or more processing circuits, wherein the one or more processing circuits may be configured to process at least one of the signal information received from sensor circuit 506 and the bit pattern modulated onto the discharge pulse. One or more processing circuits may include decoder circuit 532 configured to decode at least one of the bit pattern modulated discharging current pulse and encoded signal information received from sensor circuit 506. One or more processing circuits may include a current sensor circuit.

Circuit arrangement 502 may include a host interface 544, e.g. a serial peripheral interface. The one or more processing circuits may be implemented by any type of hired wired logic circuit or programmable logic circuit such as one or more Application Specific Integrated Circuits (ASIC), one or more Field Programmable Gate Arrays (FPGA), one or more Programmable Logic Arrays (PLA), or one or more programmable processors, such as e.g. one or more microprocessors.

One or more current-sense circuits 536 and decoder circuit 532 which may be connected to external circuits are particularly sensitive elements in the signal chain, as they may be exposed to high electrical stress, particularly from electrostatic charging, or electromagnetic pulses.

Synchronization control circuit 528 may include the basic functionalities of one or more or all the features described with respect to synchronization control circuit 428. Decoder circuit 532 may include the basic functionalities of one or more or all the features described with respect to decoder circuit 532. Voltage regulator circuit 534 may include the basic functionalities of one or more or all the features described with respect to voltage regulator circuit 534. One or more current sense circuits 536 may include the basic functionalities of one or more or all the features described with respect to one or more current sense circuits 436. One or more current sense circuits 536 may each include a current sense resistor, e.g. Rcs, which may be implemented in receiver circuit 504, either as current sense resistor Rcs1 or as current sense resistor Rcs2 (as shown in dotted line). Receiver power supply 538 may include the basic functionalities of one or more or all the features described with respect to receiver power supply 538.

Circuit arrangement 502 may include discharge circuit 508 and modulation circuit 512, which may each include the basic functionalities of one or more or all the features described respectively with respect to discharge circuit 408 and modulation circuit 412. Discharge circuit 508 and modulation circuit 512 may be arranged within a single unit, e.g. within a single discharge-modulation circuit 546 having a discharge circuit component 508 and a modulation circuit component 512.

Discharge circuit 508 may include a current sink, which may be used to discharge parasitic capacitances. The discharge of parasitic capacitance is necessary after every transmission of synchronization pulse. Added intelligence may be provided to discharge circuit 508. For example, using modulation circuit 512. Therefore, for self-diagnosis, i.e. self-testing, no additional elements in the signal chain need be integrated. Modulation circuit 512 may be configured to generate the bit pattern wherein the bit pattern includes an encoded bit pattern.

In order to provide a system wherein continual testing, e.g. real time testing, of a signal chain circuit arrangement (a receiver) 502 during operations times may be easily implemented, a test signal bit pattern may be generated in the time intervals $t_5$ to $t_8$, wherein no sensor data is received or transmitted, e.g. in synchronization time $t_S$ as already define with respect to FIGS. 3A and 3B. Therefore, the testing of the signal chain may be carried out during the operation of the sensor and the receiver arrangement.

Figure 5B:
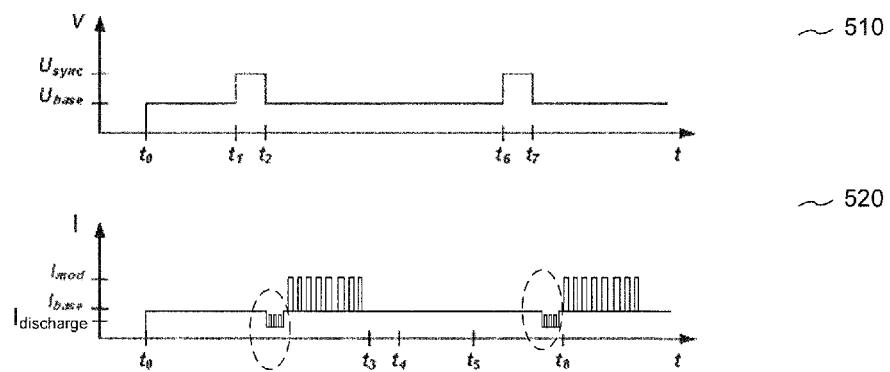
FIG. 5B shows a timing diagram of a circuit arrangement according to an embodiment.

Receiver circuit 504 may be configured to receive signal information including a current signal, e.g. quiescent current signal $I_{base}$, from sensor circuit 506 as shown in FIG. 5B. Circuit arrangement 502 may be configured to send one or more indication signals, e.g. synchronization pulses $U_{sync}$. Circuit arrangement 502 may be configured to send an indication signal, e.g. synchronization pulse $U_{sync}$. The indication signal may be part of a series of indication signals. For example of first indication signal may be transmitted during the time interval $t_1$ to $t_2$ and a further indication signal may be transmitted during the time interval $t_6$ to $t_7$, to sensor circuit 506 to indicate that signal information including encoded sensor data information can be sent to receiver circuit 504 of circuit arrangement 502 from the sensor circuit 506. Receiver circuit 504 may be configured to send an indication signal to sensor circuit 506 to indicate that signal information can be sent to receiver circuit 504 from sensor circuit 506. Receiver circuit 504 may be configured to send an indication signal to sensor circuit 506 to indicate that signal information including encoded sensor data information can be sent to receiver circuit 504 from sensor circuit 506.

Discharge circuit 508 may be configured to discharge the capacitances, e.g. $C_S$, $C_L$, $C_P$, by drawing a current after circuit arrangement 502 has sent the indication signal to sensor circuit 506, as shown in 520 and 320. The discharging may occur by drawing a current through discharge circuit 508, for example, allowing a flow of charges through discharge circuit 508. Sensor circuit may be configured to send the signal information including encoded sensor data information to receiver circuit 504 after discharge circuit 508 has discharged the capacitance in circuit arrangement 502, as shown in 520 and 330.

In intervals where no sensor data is received, e.g. in synchronization time $t_S$, $t_5$ to $t_8$, a defined current modulation signal may be generated by discharge circuit 508 and modulation circuit 512. The functionality of elements of the signal chain in receiver 502 may be tested, wherein the elements of the signal chain may include decoder circuit 532 and one or more current sense circuits 536. Therefore, modulation circuit 512 may be configured to modulate a bit pattern, wherein the bit pattern may include a test signal bit pattern, onto at least a portion of the discharging current pulse, i.e. in the time period wherein no sensor data is received or transmitted, as shown in 520 (see encircled portion).

Modulation circuit 512 may be configured to generate the bit pattern such that it includes an encoded bit pattern. Therefore, discharge circuit 508 in circuit arrangement (receiver 502) may also be used as a modulator, e.g. in connection with modulation circuit 512, to test the signal chain in defined interval elements. Modulation circuit 512 may provide a bit pattern, which may be transformed via discharge circuit 508, e.g. current sink, into a defined current signal. The provided bit pattern may, for example, be Manchester-encoded, e.g Manchester-1 coded, e.g Manchester-2 coded. The bit pattern may be received by circuit arrangement 502 like a current modulation through an external sensor, and can be compared with known sent signals. According to an embodiment, a voltage modulated signal or a digital test master, e.g. Manchester-encoded, may be specified by host controller 516 and transmitted over synchronization control circuit 528 and discharge circuit 508 and modulation circuit 512, which may generate an equivalent current modulated test signal bit pattern over the current sink.

Therefore, receiver circuit 504 may be configured to receive signal information including encoded sensor data information from the sensor circuit. Receiver circuit 504 may be configured to receive signal information which includes a modulated discharging current pulse including an encoded bit pattern modulated onto at least a portion of the discharging current pulse, and encoded sensor data information from the sensor circuit.

Various embodiments provide a circuit arrangement including receiver circuit 504 configured to receive prescheduled signal information from sensor circuit 506; discharge circuit 508 configured to discharge a capacitance by providing a discharge pulse; and modulation circuit 512 configured to modulate a bit pattern during an unused time period by the prescheduled signal information transmission from sensor circuit 506. In other words, receiver circuit 504 may be configured to receive signal information including the equivalent current modulate signal test signal bit pattern during the time period wherein no sensor data is being transmitted or received, and subsequently receiving encoded sensor data information from the sensor circuit. Although the modulated test signal is only shown in encircled portion in figured 5B (520), it may be understood that modulation circuit 512 may be configured to modulated the bit pattern onto the current signal for example between time periods t1 to t2, t3 to t4 and/or t4 to t5 and/or t5 to t8, i.e. the time periods wherein no sensor data is being transmitted or received. The unused time period t7 to t8, may include a time period used by discharge circuit 508 for discharging a capacitance by providing the discharge pulse. As a result, a longer period may be made available for modulating of the test bit pattern into the receive current signal, and as a result, longer test bit patterns may be used, if the unused time periods are used for modulation of bit patterns. It may also be understood that the discharge current Idischarge, whereas shown in 520 to be below Ibase, may also be larger than Ibase. For example, when all capacitances are discharged.

The current modulated signal may be received over the signal chain, e.g. over decoder circuit 532 and one or more current sense circuits 536, and transmitted back to host controller circuit 516. The one or more processing circuits may be configured to process the signal information received from the sensor circuit, wherein the one or more processing circuits include decoder circuit 532 configured decode the modulated discharging current pulse and the encoded sensor data information. The one or more processing circuits, may be configured to process the signal information including the modulated discharging current pulse and encoded sensor data information. The one or more processing circuits include decoder circuit 532 configured decode the modulated discharging current pulse and the encoded sensor data information. The one or more processing circuits include a current sensor circuit, e.g. one or more current sense circuits 536. The one or more processing circuits include a host interface 544, e.g. a serial peripheral interface, e.g. an input/output interface. Circuit arrangement 502 may further include controller circuit 516 connected to the one or more processing circuits, wherein controller circuit 516 may be configured to receive at least one of the signal information processed by the one or more processing circuits and the bit pattern modulated discharge pulse processed by the one or more processing circuits. Controller circuit 516 may be further configured to determine a performance of circuit arrangement 502 based on the bit pattern modulated discharge pulse processed by the one or more processing circuits. Circuit arrangement 502 may further include controller circuit 516 connected to receiver circuit 504, wherein controller circuit 516 may be configured to generate the bit pattern such that it includes an encoded bit pattern. Controller circuit 516 may be configured to control the generation of the discharge pulse by discharge circuit 508.

Circuit arrangement 502 may include one or more processing circuits, wherein the one or more processing circuits may be configured to process the signal information received from sensor circuit 506. Circuit arrangement 502 may include controller circuit 516 connected to the one or more processing circuits, wherein controller circuit 516 may be configured to receive signal information processed by the one or more processing circuits.

Controller circuit 516 may be further configured to determine a performance of circuit arrangement 502 based on the received signal information processed by the one or more processing circuits. Controller circuit 516 may compare the received data with the data sent beforehand. According to an embodiment, host controller circuit 516 may include a sensor. Host controller circuit 516 may be configured to receive data over various channels, through which a narrowing of the mistakes is possible, depending on which of the current sense circuit 536, decoder circuit 532 or SPI interface 544 is faulty. Controller circuit 516 may be further configured to determine a performance of the circuit arrangement based on the modulated discharging current pulse of the received signal information processed by the one or more processing circuits.

Power supply 538 may be controlled by discharge unit 508, which in turn receives control signals for the purpose of synchronization from the synchronization control circuit 428. The synchronization may be controlled from controller circuit 516, which may include a host controller circuit, e.g. through a series of voltage pulses, e.g. sync_trig.

According to another embodiment, controller circuit 516 may be configured to generate the bit pattern such that it includes an encoded bit pattern. The bit pattern signal to be modulated by modulation circuit 512 may be set from controller circuit 516. Alternatively, the bit pattern signal may be permanently stored in circuit arrangement 502. The test bit patterns permanently stored in circuit arrangement 502 may be self-activated from an external host, e.g. controller circuit 516, or a further controller circuit, or from circuit arrangement 502, or both.

According to an embodiment, modulation circuit 512 may be configured to modulate a bit pattern onto at least a portion of the encoded sensor data information from sensor circuit 506.

According to an embodiment, although the bit pattern test signal may be specified from host controller circuit 516, there is also the possibility, e.g. to test timing, tolerance in decoder circuit 532.

According to an embodiment, it is also possible that pre-defined test patterns may be stored in discharge circuit 508 and modulation circuit 512, which may be activated through synchronization control circuit 528.

Circuit arrangement 502 may include one or more features of current receiver architectures, e.g. a PS15 satellite receiver, e.g. a PSI5 satellite receiver in TLE 7729. Circuit arrangement 502 may include one or more or all the features of current receiver architectures, e.g. a PSI5 satellite receiver in TLE 7729.

According to an embodiment, circuit arrangement 502 may be configured to perform fault injection. Modulation circuit 512 may be configured to generate a bit pattern, wherein the bit pattern may include at least one of the following faults, e.g. missing start bits, e.g. false bit timing, a Manchester error. Modulation circuit 512 may be configured to modulate a bit pattern onto at least a portion of the discharging current pulse. According to another embodiment, sensor circuit 506 may send pre-defined data often also in multiple copies. Modulation circuit 512 may include one or more modulation circuits (not shown), which may be configured to interfere with signal information from sensor circuit 506 through additional modulation, in order to test the failure recognition capability of decoder circuit 532, e.g. such as the error recognition methods of decoder circuit 532.

According to an embodiment, signals received from decoder circuit 532 and decoded signals may additionally be transmitted to synchronization control circuit 528, and one or more times through discharge circuit 508 and modulation circuit 512. Through this, a redundancy from sensor 506 may be emulated, and therefore, sporadic errors in the signal chain may be detected. The further emulated signal may include an n-bit CRC from the first decoded signal. This redundancy may not apply to SPI interfaces itself, but at least to further processing in receiver circuit 504 and the following communications to the microcontroller. Furthermore, it is implicit here that the self-test of receiver circuit 504 may include controller circuit 516, e.g. a microcontroller, which may consistently examine consecutive data packets.

According to an embodiment, circuit arrangement 512 may include a discharge-modulation circuit 546, which may include a discharge circuit component 508 and a modulation circuit component 512. Discharge-modulation circuit 546 may be configured to generate a current-modulated signal, e.g. a Manchester encoded current-modulated signal. Discharge-modulation circuit 546 may be configured to function as a receiver modulation unit. Discharge-modulation circuit 546 may be configured as a sensor emulator.

According to an embodiment, the defined current modulated bit pattern signal generated through discharge-modulation circuit 546 may be used to test a signal chain in circuit arrangement 502.

According to an embodiment, discharge-modulation circuit 546, may be used to target disruption of the transmission channel, e.g. 514, to test the error recognition mechanism in the signal chain.

It may be understood that various embodiments provide a circuit arrangement 502, including a receiver circuit 504 configured to receive a signal from a sensor circuit 506; a discharger 508 configured to discharge a capacitance by providing a discharge pulse; and a modulator 512 configured to modulate a bit pattern onto the discharge pulse.

It may be understood that various embodiments provide a circuit arrangement 502, including a receiver circuit 504; a sensor circuit 506; a discharge circuit 508; and a modulation circuit 512; wherein the receiver circuit 504 may be configured to receive at least one of a sensor signal information from the sensor circuit 506 and a discharge circuit signal from the discharge circuit 508; wherein the discharge circuit signal may include a discharge pulse indicating discharge of a capacitance by the discharge circuit 508, and wherein the discharge circuit signal may include a bit pattern modulated onto at least part of the discharge pulse by the modulation circuit 512.

Figure 6:
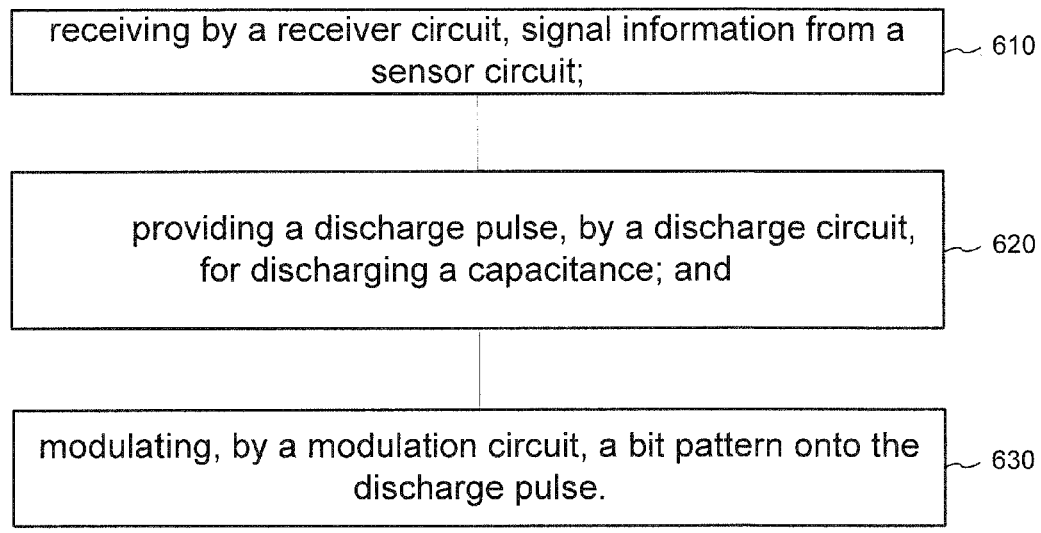
FIG. 6 shows a method for receiving information by a circuit arrangement according to an embodiment.

FIG. 6 shows a method for receiving information by a circuit arrangement according to an embodiment. The method includes receiving by a receiver circuit, signal information from a sensor circuit;

providing a discharge pulse, by a discharge circuit, for discharging a capacitance; and modulating, by a modulation circuit, a bit pattern onto the discharge pulse.

Figure 7:
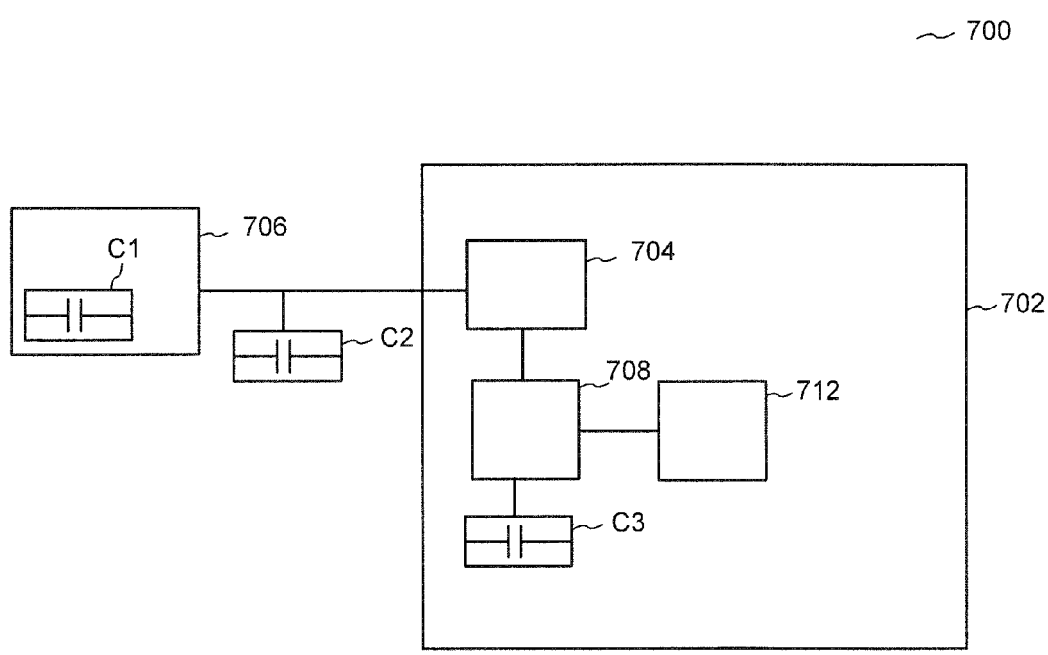
FIG. 7 shows a circuit arrangement according to an embodiment.

FIG. 7 shows circuit arrangement 702 according to an embodiment. Circuit arrangement 702 may include receiver circuit 704; sensor circuit 706; a discharge circuit 708; and modulation circuit 712; wherein receiver circuit 704 may be configured to receive at least one of a sensor signal information from sensor circuit 706 and a discharge circuit signal from discharge circuit 708; wherein the discharge circuit signal may include a discharge pulse indicating discharge of a capacitance by discharge circuit 708, and wherein the discharge circuit signal may include a bit pattern modulated onto at least part of the discharge pulse by modulation circuit 712.

Receiver 704 may include the basic functionalities of one or more or all the features described with respect to receiver circuit 504. Discharging circuit 708 may include the basic functionalities of one or more or all the features described with respect to discharge circuit 508. Sensor circuit 706 may include the basic functionalities of one or more or all the features described with respect to sensor circuit 506. Modulation circuit 712 may include the basic functionalities of one or more or all the features described with respect to modulation circuit 512.

Various embodiments provide a circuit arrangement, including a receiver circuit configured to receive signal information from a sensor circuit; a discharge circuit configured to discharge a capacitance by providing a discharge pulse; and a modulation circuit configured to modulate a bit pattern onto the discharge pulse.

According to an embodiment, the receiver is configured to receive signal information including a current signal from the sensor circuit.

According to an embodiment, the receiver circuit is configured to receive signal information including encoded sensor data information from the sensor circuit.

According to an embodiment, the receiver circuit is configured to send an indication signal to the sensor circuit to indicate that signal information can be sent to the receiver circuit from the sensor circuit.

According to an embodiment, the receiver circuit is configured to send an indication signal to the sensor circuit to indicate that signal information including encoded sensor data information can be sent to the receiver circuit from the sensor circuit.

According to an embodiment, the discharge circuit is located in the receiver circuit.

According to an embodiment, the discharge circuit is located in the sensor circuit.

According to an embodiment, the discharge circuit is configured to provide the discharge pulse for discharging the capacitance, depending on the timing of signal information received by the receiver circuit.

According to an embodiment, the discharge circuit is configured to provide the discharge pulse for discharging the capacitance after the circuit arrangement has sent the indication signal to the sensor circuit.

According to an embodiment, the sensor circuit is configured to send the signal information including encoded sensor data information to the receiver circuit after the discharge circuit has discharged the capacitance.

According to an embodiment, the discharge circuit includes a current-sink.

According to an embodiment, the modulation circuit is configured to generate the bit pattern wherein the bit pattern includes an encoded bit pattern.

According to an embodiment, the circuit arrangement further includes one or more processing circuits, wherein the one or more processing circuits are configured to process at least one of the signal information received from the sensor circuit and the bit pattern modulated onto the discharge pulse.

According to an embodiment, the one or more processing circuits include a decoder circuit configured to decode at least one of the bit pattern modulated discharging current pulse and encoded signal information received from the sensor circuit.

According to an embodiment, the one or more processing circuits includes a current sensor circuit.

According to an embodiment, the circuit arrangement further includes a controller circuit connected to the one or more processing circuits, wherein the controller circuit is configured to receive at least one of the signal information processed by the one or more processing circuits and the bit pattern modulated discharge pulse processed by the one or more processing circuits.

According to an embodiment, the controller circuit is further configured to determine a performance of the circuit arrangement based on the bit pattern modulated discharge pulse processed by the one or more processing circuits.

According to an embodiment, the circuit arrangement further includes controller circuit connected to the receiver circuit, wherein the controller circuit is configured to generate the bit pattern such that it includes an encoded bit pattern.

According to an embodiment, the controller circuit is configured to control the generation of the discharge pulse by the discharge circuit.

According to an embodiment, the receiver circuit is configured to generate the bit pattern such that it includes an encoded bit pattern.

According to an embodiment, the discharge circuit is configured to discharge a capacitance from at least one of the sensor circuit and the receiver circuit.

Various embodiments provide a method for receiving information, the method including receiving by a receiver circuit, signal information from a sensor circuit; providing a discharge pulse, by a discharge circuit, for discharging a capacitance; and modulating, by a modulation circuit, a bit pattern onto the discharge pulse.

Various embodiments provide a circuit arrangement, including a receiver configured to receive a signal from a sensor circuit; a discharger configured to discharge a capacitance by providing a discharge pulse; and a modulator configured to modulate a bit pattern onto the discharge pulse.

Various embodiments provide a circuit arrangement, including a receiver circuit; a sensor circuit; a discharge circuit; and a modulation circuit; wherein the receiver circuit is configured to receive at least one of a sensor signal information from the sensor circuit and a discharge circuit signal from the discharge circuit; wherein the discharge circuit signal includes a discharge pulse indicating discharge of a capacitance by the discharge circuit, and wherein the discharge circuit signal includes a bit pattern modulated onto at least part of the discharge pulse by the modulation circuit.

Various embodiments provide a circuit arrangement including a receiver circuit configured to receive prescheduled signal information from a sensor circuit; a discharge circuit configured to discharge a capacitance by providing a discharge pulse; and a modulation circuit configured to modulate a bit pattern during an unused time period by the prescheduled signal information transmission from the sensor circuit.

According to an embodiment, the unused time period comprises a time period used by a discharge circuit for discharging a capacitance by providing the discharge pulse.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising
a discharge circuit configured to discharge a capacitor at a first node by providing a discharge current;
a modulation circuit coupled to the discharge circuit, the modulation circuit configured to modulate a bit pattern onto the discharge current to produce a bit pattern modulated discharge current; and
a receiver circuit configured to send an indication signal to a sensor circuit via the first node and further configured to receive signal information via a signal current flowing through the first node from the sensor circuit after sending the indication signal, wherein the receiver circuit comprises
a transistor having a current conduction path, a first current conduction path terminal coupled to a first end of the current conduction path, and a second current conduction path terminal coupled to a second end of the current conduction path opposite the first end,
a resistor coupled to the second current conduction path terminal of the transistor, the resistor configured to receive at least a portion of the bit pattern modulated discharge current and at least a portion of the signal current, and
a decoder circuit coupled to the resistor, the decoder circuit configured to decode the bit pattern from the bit pattern modulated discharge current and configured to decode the signal information from the signal current.

2. The circuit arrangement according to claim 1, wherein the receiver circuit is configured to receive signal information comprising a current signal from the sensor circuit.

3. The circuit arrangement according to claim 1, wherein the receiver circuit is configured to receive signal information comprising encoded sensor data information from the sensor circuit.

4. The circuit arrangement according to claim 1, wherein the receiver circuit is configured to send an indication signal to the sensor circuit to indicate that signal information can be sent to the receiver circuit from the sensor circuit.

5. The circuit arrangement according to claim 4, wherein the discharge circuit is configured to provide the discharge current for discharging the capacitor after the circuit arrangement has sent the indication signal to the sensor circuit.

6. The circuit arrangement according to claim 1, wherein the receiver circuit is configured to send an indication signal to the sensor circuit to indicate that signal information comprising encoded sensor data information can be sent to the receiver circuit from the sensor circuit.

7. The circuit arrangement according to claim 1, wherein the discharge circuit is located in the receiver circuit.

8. The circuit arrangement according to claim 1, wherein the discharge circuit is located in the sensor circuit.

9. The circuit arrangement according to claim 1, wherein the discharge circuit is configured to provide the discharge current for discharging the capacitor, depending on the signal information received by the receiver circuit.

10. The circuit arrangement according to claim 1, wherein the sensor circuit is configured to send the signal information comprising encoded sensor data information to the receiver circuit after the discharge circuit has discharged the capacitance.

11. The circuit arrangement according to claim 1, wherein the discharge circuit comprises a current-sink.

12. The circuit arrangement according to claim 1, wherein the modulation circuit is configured to generate the bit pattern
wherein the bit pattern comprises an encoded bit pattern.

13. The circuit arrangement according to claim 1, further comprising
one or more processing circuits, wherein the one or more processing circuits are configured to process at least one of the signal information received from the sensor circuit and the bit pattern modulated onto the discharge current.

14. The circuit arrangement according to claim 13, wherein the one or more processing circuits comprise the decoder circuit, wherein the decoder circuit is configured to decode at least one of the bit pattern modulated discharge current and encoded signal information received from the sensor circuit.

15. The circuit arrangement according to claim 13, wherein the one or more processing circuits comprises a current sensor circuit.

16. The circuit arrangement according to claim 13, further comprising
a controller circuit connected to the one or more processing circuits, wherein the controller circuit is configured to receive at least one of the signal information processed by the one or more processing circuits and the bit pattern modulated discharge current processed by the one or more processing circuits.

17. The circuit arrangement according to claim 16, wherein the controller circuit is further configured to determine a performance of the circuit arrangement based on the bit pattern modulated discharge current processed by the one or more processing circuits.

18. The circuit arrangement according to claim 1, further comprising a controller circuit connected to the receiver circuit,
wherein the controller circuit is configured to generate the bit pattern such that it comprises an encoded bit pattern.

19. The circuit arrangement according to claim 18, wherein the controller circuit is configured to control the generation of the discharge current by the discharge circuit.

20. The circuit arrangement according to claim 1, wherein the receiver circuit is configured to generate the bit pattern such that it comprises an encoded bit pattern.

21. The circuit arrangement according to claim 1, wherein the discharge circuit is configured to discharge a capacitance from at least one of the sensor circuit and the receiver circuit.

22. The circuit arrangement of claim 1, wherein the receiver circuit is further configured to receive the bit pattern modulated discharge current.

23. The circuit arrangement of claim 22, wherein the circuit arrangement is configured to determine whether the receiver circuit is functioning based on the received bit pattern modulated discharge current.

24. The circuit arrangement of claim 1, wherein:
the transistor is configured to apply a power supply voltage to the first node; and the receiver circuit is configured to send the indication signal by modifying the applied power supply voltage.

25. A method for receiving information, the method comprising
providing a discharge current, by a discharge circuit, for discharging a capacitor at a first node;
modulating, by a modulation circuit coupled to the discharge circuit, a bit pattern onto the discharge current to produce a bit pattern modulated discharge current;
sending, by a receiver circuit, an indication signal to a sensor circuit via the first node;
receiving, by the receiver circuit, signal information from the sensor circuit via a signal current flowing through the first node after sending the indication signal;
receiving, by the receiver, the bit pattern modulated discharge current;
decoding the bit pattern from the bit pattern modulated discharge current using a decoder circuit;
determining whether the receiver is functioning based on the decoded bit pattern;
decoding the signal information from the signal current using the decoder circuit; and
generating a power supply voltage at the first node, wherein sending the indication signal comprises modifying the power supply voltage.

26. A circuit arrangement, comprising
a discharger configured to discharge a capacitor of at least one capacitor disposed in a sensor circuit by providing a discharge current at a first node, wherein the at least one capacitor is connected to the first node;
a modulator coupled to the discharger, the modulator configured to modulate a bit pattern onto the discharge current to produce a bit pattern modulated discharge current; and
a receiver configured to send an indication signal to the sensor circuit via the first node and further configured to receive a signal from the sensor circuit via a signal current flowing through the first node after sending the indication signal, wherein the receiver comprises
a transistor having a current conduction path, a first current conduction path terminal coupled to a first end of the current conduction path, and a second current conduction path terminal coupled to a second end of the current conduction path opposite the first end,
a resistor coupled to the second current conduction path terminal of the transistor, the resistor configured to receive at least a portion of the bit pattern modulated discharge current and at least a portion of the signal current, and
a decoder circuit coupled to the resistor, the decoder circuit configured to decode the bit pattern from the bit pattern modulated discharge current and configured to decode the signal from the signal current.

27. The circuit arrangement of claim 26, wherein:
the transistor is configured to apply a power supply voltage to the first node; and
the receiver is configured to send the indication signal by modifying the applied power supply voltage.

28. A circuit arrangement, comprising
a receiver circuit;
a sensor circuit coupled to the receiver circuit via a first node;
a discharge circuit coupled to the first node; and
a modulation circuit coupled to the discharge circuit;
wherein a signal of the discharge circuit comprises a discharge current indicating discharge of a capacitor by the discharge circuit, wherein the capacitor and the discharge circuit are connected to the first node,
wherein the signal of the discharge circuit comprises a bit pattern modulated onto at least part of the discharge current by the modulation circuit to form a bit pattern modulated discharge current,
wherein the receiver circuit is configured to send an indication signal to the sensor circuit via the first node and further configured to receive sensor signal information from the sensor circuit via the first node after sending the indication signal,
wherein the receiver circuit comprises
a transistor having a current conduction path, a first current conduction path terminal coupled to a first end of the current conduction path, and a second current conduction path terminal coupled to a second end of the current conduction path opposite the first end,
a resistor coupled to the second current conduction path terminal of the transistor, the resistor configured to receive at least a portion of the bit pattern modulated discharge current and at least a portion of the signal current, and
a decoder circuit coupled to the resistor, the decoder circuit configured to decode the bit pattern from the bit pattern modulated discharge current and configured to decode the signal from the signal current.

* * * * *